(12) United States Patent
Nagler

(10) Patent No.: US 6,769,289 B2
(45) Date of Patent: Aug. 3, 2004

(54) METHOD OF TESTING VACUUM PACKAGES FOR SEAL-TIGHTNESS

(75) Inventor: Peter Nagler, Fellbach (DE)

(73) Assignee: imt Robot AG, Fellbach (DE)

( * ) Notice: Subject to any disclaimer, the term of this patent is extended or adjusted under 35 U.S.C. 154(b) by 0 days.

(21) Appl. No.: 10/249,606

(22) Filed: Apr. 23, 2003

(65) Prior Publication Data

US 2003/0200793 A1 Oct. 30, 2003

(30) Foreign Application Priority Data

Apr. 24, 2002 (EP) .......................................... 02009082

(51) Int. Cl.$^7$ ................................................ G01M 3/34
(52) U.S. Cl. ................. 73/49.3; 73/40; 73/41; 73/45.1; 73/45.3; 73/45.4; 73/49.2
(58) Field of Search ................................ 73/40, 41, 45, 73/45.1, 45.3, 45.4, 49.2, 49.3

(56) References Cited

U.S. PATENT DOCUMENTS

| | | | |
|---|---|---|---|
| 2,383,936 A | * 9/1945 | Hohl ........................ 73/49.3 |
| 3,998,091 A | 12/1976 | Paquette et al. ................ 73/52 |
| 4,709,578 A | * 12/1987 | Iwasaki et al. .............. 73/49.3 |
| 4,942,758 A | * 7/1990 | Cofield ........................ 73/49.2 |
| 5,111,684 A | 5/1992 | Stauffer et al. .............. 73/49.3 |

FOREIGN PATENT DOCUMENTS

DE 297 09 635 5/1998 .................. 73/49.3

* cited by examiner

*Primary Examiner*—Daniel S. Larkin
(74) *Attorney, Agent, or Firm*—Gudrun E. Huckett

(57) ABSTRACT

A method for testing a vacuum package with regard to seal-tightness, the vacuum package is placed with at least one surface section against at least one contact surface of a vacuum device. A vacuum is generated on a side of the contact surface opposite the vacuum package. A parameter indicative of an air flow through the contact surface in a flow direction away from the vacuum package is measured. The parameter is compared with at least one limit value. A first state is assigned to the vacuum package when the parameter surpasses the at least one limit value and a second state is assigned to the vacuum packaged when the parameter drops below the at least one limit value.

9 Claims, 2 Drawing Sheets

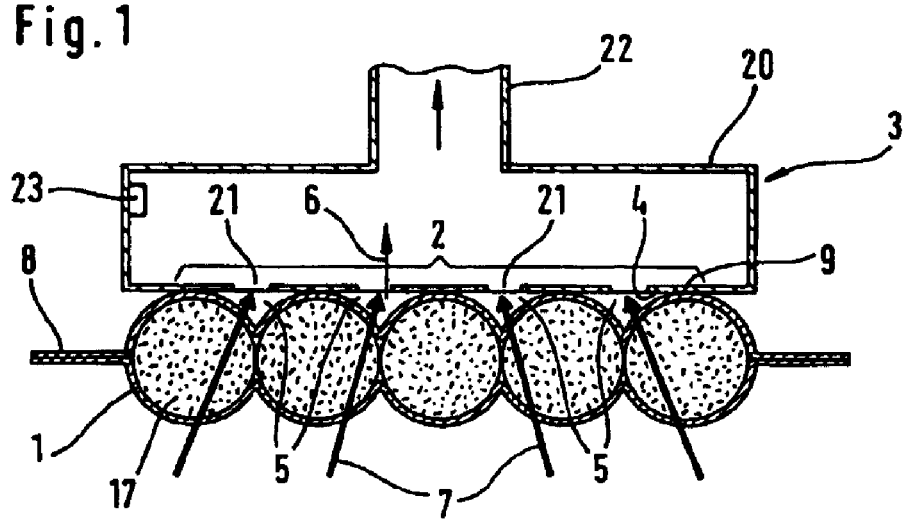
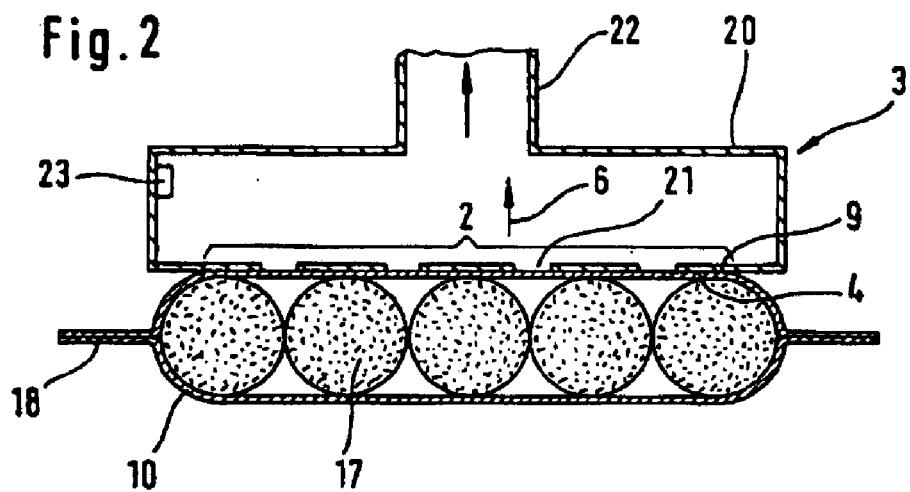
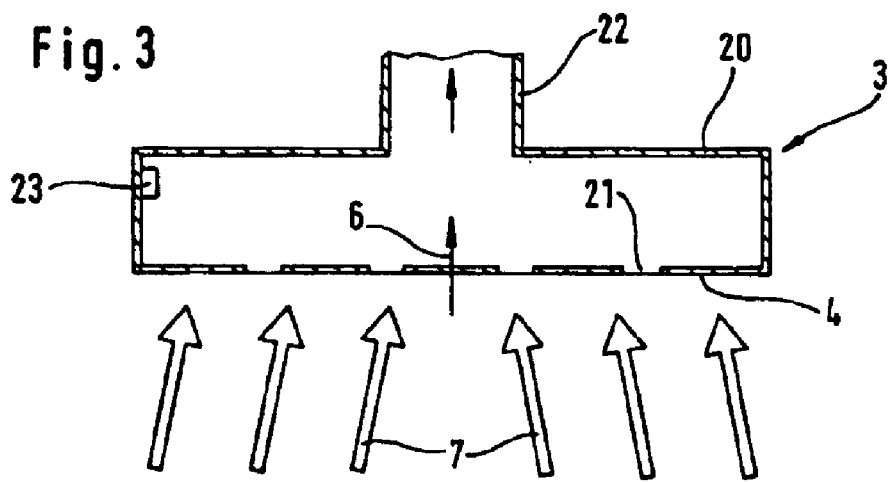

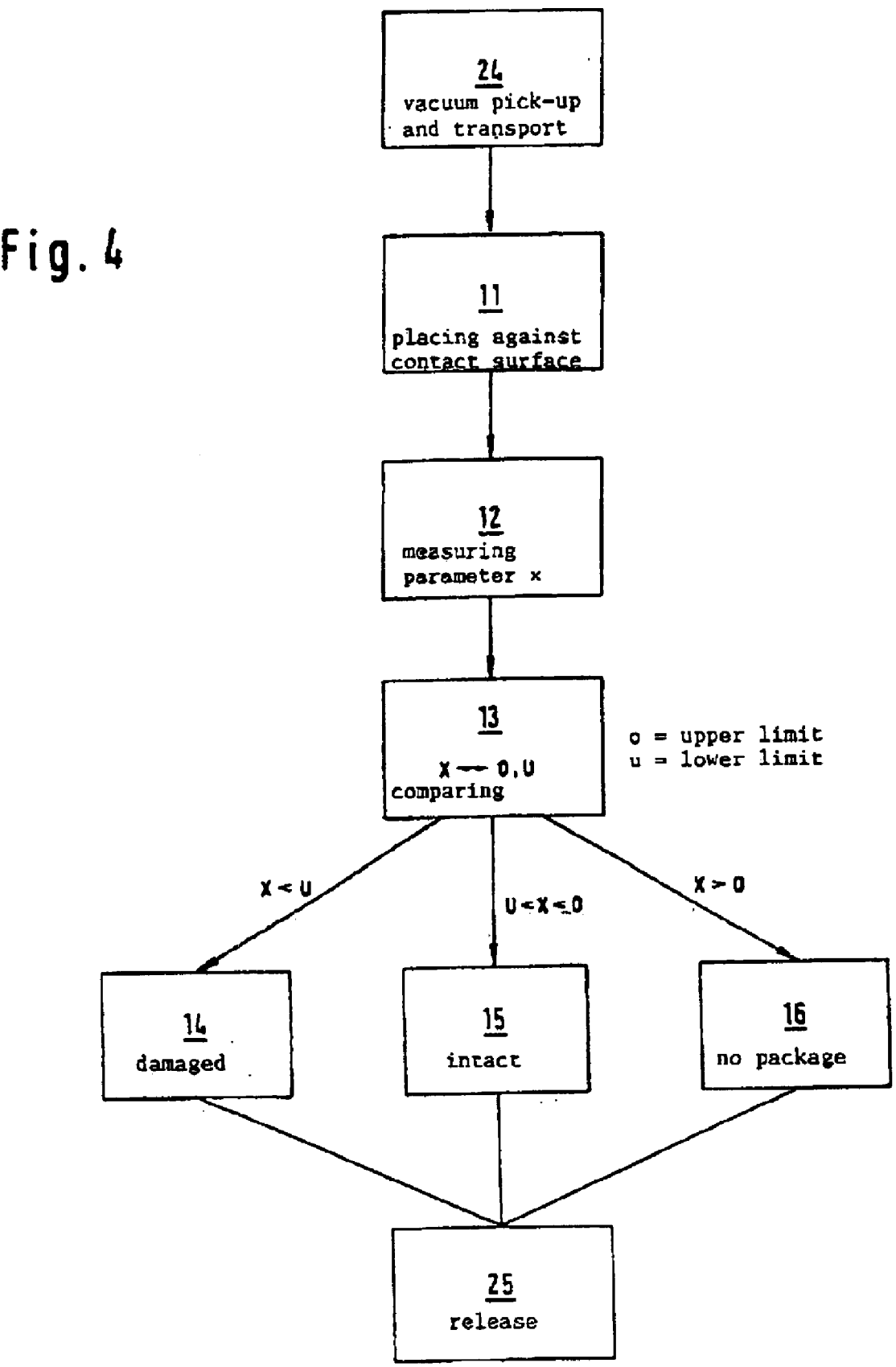

METHOD OF TESTING VACUUM PACKAGES FOR SEAL-TIGHTNESS

BACKGROUND OF INVENTION

1. Field of the Invention

The invention relates to a method for testing vacuum packages.

2. Description of the Related Art

Vacuum packages are checked visually with regard to seal-tightness. Generally, in vacuum-sealed packages the packaging does not rest tightly against the article when the seal or welding seam is leaking. The packaging lifts off the article and is loose. Air can penetrate into the package, and this can cause the vacuum package to become unstable.

SUMMARY OF INVENTION

It is an object of the present invention to provide a method for testing vacuum packages that can be performed easily.

In accordance with the present invention, this is achieved in that the packaging is placed with at least one surface section against at least one contact surface of a vacuum device, wherein the vacuum device in operation produces a vacuum behind the contact surface, viewed in the flow direction; in that a parameter correlated with the air flow through the contact surface is measured; in that the parameter is compared with at least one limit value; and in that a first state is assigned to the vacuum package when surpassing the limit value and a second state is assigned to the vacuum package when dropping below the limit value.

When a vacuum package is intact, the packaging, usually a packaging film, rests tightly against the packaged article. When the vacuum package is damaged, the packaging film no longer rests tightly against the packaged article because via the damaged location of the packaging surrounding air can penetrate into the package. When the vacuum package is placed with a surface section against a contact surface of a vacuum device and a vacuum is generated by means of the vacuum device, the vacuum package is sucked against the contact surface of the vacuum. When the vacuum package is intact, intermediate spaces remain between the packaging and the contact surface of the vacuum device. When air can penetrate Into the package as a result of the packaging material being damaged, the packaging film is pulled or sucked against the contact surface of the vacuum device and closes the vacuum device to a great extent.

By measuring a parameter which is correlated with the air flow through the contact surface and comparing the parameter with at least one limit value, it is possible in a simple way to determine whether a package rests against the contact surface, whether the vacuum package is seal-tight, or whether air can penetrate into the package. A corresponding state is then assigned to the package.

The method requires no complex devices and can be performed with simple means. The method can be used for testing the seal-tightness of the package or for testing whether a package rests against the contact surface. Both tests can be performed at the same time when a comparison is carried out relative to several limit values.

Advantageously, the vacuum package has at least one partially profiled surface In the surface section while the contact surface is substantially planar. The profiled surface of the vacuum package enables performing of the method with a conventional vacuum device having a planar surface. The method can be performed also In the case of vacuum packages with a planar surface when the contact surface is expediently provided with a profiling.

Advantageously, the parameter is compared with a lower limit value. When the vacuum package is intact, the Intermediate spaces between the contact surface and the surface section remain intact. The air flow through the contact surface reaches a constant value when operating the vacuum device. When the vacuum package is damaged, the packaging material is pulled against the contact surface so that the intermediate space is reduced. The air flow through the contact surface is thus also reduced. When the air flow drops below a lower limit value, the vacuum package is damaged.

Advantageously, the parameter is compared with an upper limit value. When the air flow through the contact surface of the vacuum device is very large, no vacuum package rests against the contact surface.

Expediently, the parameter is selected to be the pressure downstream of the contact surface. The pressure downstream of the contact surface can be measured with simple means and allows to draw direct conclusions in regard to the air flow through the contact surface because the vacuum device produces a vacuum downstream of the contact surface. When the pressure downstream of the contact surface drops significantly, the air flow through the contact surface is minimal and the vacuum package is damaged. However, it can be expedient to measure as a parameter the course of the pressure. In particular In the case of small damaged areas of the vacuum package, the packaging is not immediately pulled against the contact surface upon applying the vacuum but will approach it slowly. The drop in pressure downstream of the contact surface indicates that the vacuum package is damaged because the pressure downstream of the contact surface has a constant level when the vacuum package is intact.

As a result of the required amount of time that elapses until the vacuum package rests completely against the contact surface, it is provided that the operating parameter is measured after a predetermined time has elapsed from the moment of placing the vacuum package onto the vacuum device. Expediently, the parameter Is measured in a vacuum chamber arranged downstream of the contact surface. Advantageously, the vacuum device is a suction gripping device with which the vacuum package is gripped. Such suction grippers are known in connection with robots and automated devices and can be integrated simply and inexpensively.

The method is carried out especially in combination with a transport step. When a suction device is used for the transport step, the method can be performed in already existing devices without additional expenditure. The time that is required for performing the transport step can simultaneously be used for testing the package. Based on the test result, the transport step can be advantageously controlled so that, for example, damaged packages can be directly removed. The transport step is carried out expediently by means of a handling robot.

BRIEF DESCRIPTION OF DRAWINGS

FIG. 1 shows a vacuum device with intact vacuum package.

FIG. 2 shows a vacuum device with damaged vacuum package.

FIG. 3 shows a vacuum device without vacuum package being placed on it.

FIG. 4 is a schematic illustration of the course of the method steps.

DETAILED DESCRIPTION

FIG. 1 shows schematically a vacuum device 3 which is provided with a planar contact surface 4. The contact surface 4 forms a wall of a vacuum chamber 20 and has vacuum or suction openings 21. The vacuum package 1 is placed against the contact surface 4 with a surface section 2. The surface 9 of the vacuum package 1 rests tightly against the packaged article 17. The vacuum package 1, for example, can comprise a peripheral welding seam 8 which tightly connects two foil sections with one another. As a result of the seal-tight connection, the packaging 1 remains in tight contact on the packaged article 17. The packaged article 17 is comprised of five individual bodies of a cylindrical cross-section, for example, sausages. As a result of the profiling of the surface 9, intermediate spaces 5 are formed between the vacuum package 1 and the contact surface 4 of the vacuum device 3. When a vacuum is generated downstream of the contact surface 4, an air flow 7 flows through the intermediate spaces 5 and the contact surface Z in the flow direction 6. For a constant vacuum being generated, the flow of air will adjust to a constant level. The vacuum in the vacuum chamber 20 is generated via the vacuum connector 22 opening Into the vacuum chamber 20. The pressure sensor 23 which is arranged in the vacuum chamber 20 measures the pressure that is present.

In FIG. 2, the vacuum device 3 is illustrated with a damaged vacuum package 10.

The vacuum package 10 has a welding seam 18 by means of which the packaged article 17 is enclosed between two foil sections. Since the vacuum package 10 has a damaged area, surrounding air can penetrate into the interior of the vacuum package 10. The vacuum package 10 does not rest tightly against the packaged article 17. When vacuum is supplied downstream of the contact surface 4 in the flow direction 6, the surface 9 of the vacuum package 10 is pulled or sucked across the entire surface section 2 onto the contact surface 4. The vacuum package 10 in this way tightly seals the contact surface 4 in the contact area. Air can no longer flow through the contact surface 4. The pressure in the vacuum chamber 20, measured by the pressure sensor 23, drops as a result of the vacuum generated by the vacuum connector 22.

In FIG. 3, the vacuum device 3 is shown without vacuum package. The airflow 7 can flow unimpededly in the flow direction 6 through the contact surface 4 into the vacuum connector 22. In comparison with a vacuum package resting against the contact surface 4 as illustrated in FIG. 1, a greater air flow 7 is produced.

FIG. 4 shows schematically the course of the method steps for testing vacuum packages. In the method step 11 a vacuum package is placed with its surface section against the contact surface of the vacuum device. The contact surface and/or the surface section of the vacuum package can have a profiling so that between the two surfaces at least one intermediate space results. In the method step 12, a parameter x is measured which, for example, is proportional to the air flow through the contact surface. The parameter x can be the pressure or the course of the pressure downstream of the contact surface. The parameter x can be measured after elapse of a predetermined amount of time subsequent to the method step 11 or can be measured during a certain time period. The parameter x is then compared in method step 13 with an upper limit value o and with a lower limit value u. When the parameter x is smaller than the lower limit value u, a state 14 is assigned to the vacuum package meaning that the vacuum package is damaged. When the parameter x is greater than the upper limit value o, a state 16 is assigned according to which no packaging rests against the contact surface of the vacuum device. When the parameter x is between the lower limit value u and the upper limit value o, a state 15 is assigned which indicates that the vacuum package is intact.

When the parameter x is the course of the pressure, the upper limit value o and the lower limit value u will change correspondingly. However, it may be expedient to employ as a limit value a combination of the course of the pressure and an absolute value of the pressure. The method is advantageously performed in combination with a transport step, in particular, in connection with a handling robot. Expediently, the vacuum device 3 is a suction (vacuum) gripper. In method step 24, the vacuum package 1, 10 is picked up by means of the vacuum device 3 and transported until it is deposited or released in method step 25 at a suitable location. During the transport step carried out between steps 24 and 25, the method steps 11, 12, and 13 for checking the vacuum package 1, 10 and determining the states 14, 15, and 16 are carried out. Depending on the state which is assigned to the package, a different action can be triggered. In the case of the state 15, according to which the packaging is intact, the vacuum package can be transported to further processing steps. When the state 14 is assigned, according to which the vacuum package is damaged, the vacuum package can be sorted out or removed. When the state 16 is assigned, according to which no package has been gripped, the next package can be picked up.

While specific embodiments of the invention have been shown and described in detail to illustrate the inventive principles, it will be understood that the invention may be embodied otherwise without departing from such principles.

What is claimed is:

1. A method for testing a vacuum package comprising a flexible packaging film for seal tightness, the method comprising the steps of:

a) placing a vacuum package with at least one surface section of the flexible packaging film against at least one contact surface of a vacuum device;

b) generating a vacuum on a side of the at least one contact surface opposite the vacuum package;

c) measuring a parameter indicative of an air flow through the at least one contact surface in a flow direction away from the vacuum package, wherein the parameter is a course of pressure;

d) comparing the parameter with at least one limit value; and e) assigning a first state to the vacuum package when the parameter surpasses the at least one limit value and assigning a second state to the vacuum package when the parameter drops below the at least one limit value.

2. The method according to claim 1, wherein the at least one surface section of the flexible packaging film of the vacuum package has at least one partially profiled surface and wherein the at least one contact surface is substantially planar.

3. The method according to claim 1, wherein the at least one limit value is a lower limit value and wherein, in the step d), the parameter is compared to the lower limit value.

4. The method according to claim 1, wherein the at least one limit value is an upper limit value and wherein, in the step d), the parameter is compared to the upper limit value.

5. The method according to claim 1, wherein the parameter is measured downstream of the at least one contact surface in the flow direction.

6. The method according to claim 1, wherein, in the step c), the parameter is measured after a predetermined time period has elapsed from a moment of placing the vacuum package against the at least one contact surface.

7. The method according to claim 1, wherein the parameter is measured in a vacuum chamber arranged downstream of the at least one contact surface in the flow direction.

8. The method according to claim 1, wherein the vacuum device is a suction gripper, wherein in the step a) the vacuum package is gripped by the suction gripper in order to be placed against the at least one contact surface.

9. The method according to claim 1, further comprising a transport step, wherein the steps a) through e) are carried out during the transport step.

* * * * *